(12) United States Patent
Yang et al.

(10) Patent No.: US 7,923,541 B2
(45) Date of Patent: Apr. 12, 2011

(54) HIGH-PURITY REBAUDIOSIDE A AND METHOD OF EXTRACTING SAME

(75) Inventors: Mingfu Yang, Chengdu (CN); Jun Hua, Chengdu (CN); Ling Qin, Chengdu (CN)

(73) Assignee: Chengdu Wagott Pharmaceutical Co., Ltd., Chengdu (CN)

( * ) Notice: Subject to any disclaimer, the term of this patent is extended or adjusted under 35 U.S.C. 154(b) by 0 days.

(21) Appl. No.: 11/958,351

(22) Filed: Dec. 17, 2007

(65) Prior Publication Data

US 2008/0300402 A1 Dec. 4, 2008

Related U.S. Application Data

(60) Provisional application No. 60/903,121, filed on Feb. 22, 2007, provisional application No. 60/903,122, filed on Feb. 22, 2007.

(30) Foreign Application Priority Data

Dec. 15, 2006 (CN) .......................... 2006 1 0022507

(51) Int. Cl.
*C07H 15/256* (2006.01)
(52) U.S. Cl. ...................................... 536/18.1; 536/128
(58) Field of Classification Search ........................ None
See application file for complete search history.

(56) References Cited

U.S. PATENT DOCUMENTS

| | | | | |
|---|---|---|---|---|
| 4,361,697 | A * | 11/1982 | Dobberstein et al. ......... | 536/128 |
| 4,892,938 | A | 1/1990 | Giovanetto | |
| 5,112,610 | A | 5/1992 | Kienle | |
| 5,962,678 | A | 10/1999 | Payzant et al. | |
| 5,972,120 | A * | 10/1999 | Kutowy et al. .................. | 127/43 |
| 6,126,962 | A | 10/2000 | Chaen et al. | |
| 2003/0138538 | A1 | 7/2003 | Kitzaume et al. | |
| 2005/0233016 | A1 | 10/2005 | Hansen | |
| 2006/0083838 | A1 | 4/2006 | Jackson et al. | |
| 2006/0134292 | A1 | 6/2006 | Abelyan et al. | |
| 2006/0142555 | A1 | 6/2006 | Jonnala et al. | |
| 2007/0082103 | A1 * | 4/2007 | Magomet et al. .............. | 426/548 |
| 2007/0292582 | A1 | 12/2007 | Prakash et al. | |
| 2008/0112966 | A1 * | 5/2008 | Gow et al. ................ | 424/195.15 |

FOREIGN PATENT DOCUMENTS

| | | |
|---|---|---|
| CN | 1024348 C | 4/1994 |
| CN | 1032651 C | 8/1996 |
| CN | 1078217 C | 1/2002 |
| CN | 1098860 C | 1/2003 |
| CN | 1132840 C | 12/2003 |
| JP | 7-143860 | 6/1995 |
| JP | 2002-262822 | 9/2002 |

OTHER PUBLICATIONS

Hurtado-Benavides, A., Journal of Supercritical Fluids, Countercurrent packed column supercritical CO2 extraction of olive oil. Mass transfer evaluation, (2004), vol. 28, pp. 29-35.*
Ebringerova, A., Ultrasonics Sonochemistry, Ultrasonic extraction of plant materials-investigation of hemicellulose release from buckwheat hulls, (2003), vol. 10, pp. 127-133.*
Kowalska, I., Desalination, Separation of anionic surfactants on ultrafiltration membranes, (2004), vol. 162, pp. 33-40.*
Koch Membrane Systems (KMS), Ultrafiltration-Filtration Overview: http://web.archive.org/web/20061106072826/www.kochmembrane.com/sep_uf.html.*
Teich, L., Bioorganic and Medicinal Chemistry, Synthesis and biological evaluation of new derivatives of emodin, (2004), vol. 12, pp. 5961-5971.*
Colorado University (Boulder), Organic Chemistry Undergraduate Courses, Lab Techniques: http://web.archive.org/web/20060908105657/orgchem.colorado.edu/hndbksupport/colchrom/colchrom.html.*
Massachusetts Institute of Technology (MIT), Flash Column Chromatography Guide: http://ocw.mit.edu/NR/rdonlyres/Chemistry/5-301January—IAP-2004/768356CA-FD2C-4CB7-B87A-27D12504BBA8/0/8_9_flash_column.pdf.*
Rohm and Haas Ion Exchange Resins, Industrial Process; Brine Softening: http://web.archive.org/web/20061105062308/www.amberlyst.com/brine_softening.htm.*
Byers, John A., Solvent Polarity and Miscibility, also available at http://www.chemical-ecology.net/java/solvents.htm; or www.Phenomenex.com; published 2003; last viewed Mar. 10, 2010.*
Joint FAO/WHO Expert Committee on Food Additives (JECFA), 63rd Meeting, Geneva, Italy Jun. 8-17, 2004 (5 pages).
Koyama, E., et al., "In vitro metabolism of the glycosidic sweeteners, stevia mixture and enzymatically modified stevia in human intestinal microflora", Food and Chemical Toxicology, 41, (2005) pp. 359-374.

* cited by examiner

*Primary Examiner* — Shaojia Anna Jiang
*Assistant Examiner* — Bahar Schmidtmann
(74) *Attorney, Agent, or Firm* — Christie, Parker & Hale, LLP

(57) ABSTRACT

A process for recovering Rebaudioside A from *Stevia rebaudiana* Bertoni plants is provided and includes the steps of sequentially extracting plant material with a first solvent to obtain a first extract, filtering the first extract and passing the first extract through a polar resin to obtain a filtrate, and purifying the filtrate to obtain a crystalline-containing material. With further purification, a product containing over 99% Rebaudioside A is obtained. The present invention is also directed toward a method of purifying stevia glycosides to obtain purified Rebaudioside A. In one embodiment, the method includes silica gel column chromatography using an solvent comprising ethyl acetate and ethanol.

43 Claims, 4 Drawing Sheets

HIGH-PURITY REBAUDIOSIDE A AND METHOD OF EXTRACTING SAME

CROSS-REFERENCE TO RELATED APPLICATION

This application claims the benefit of priority of Chinese Patent Application No. 200610022507.2, filed Dec. 15, 2006; U.S. Provisional Patent Application No. 60/903,121, filed Feb. 22, 2007; and U.S. Provisional Patent Application No. 60/903,122, filed Feb. 22, 2007, the entire contents of all three applications being incorporated herein by reference.

FIELD OF THE INVENTION

The present invention relates to high purity Rebaudioside A useful as a sweetener for various foods and drinks, and to a process for producing the same.

BACKGROUND OF THE INVENTION

Stevia glycosides are a natural sweetener extracted from the leaves and stems of *Stevia rebaudiana* Bertoni, with an intense sweetness substantially greater than ordinary sugar (sucrose), yet being low in calories. The eight diterpene glycosides, namely, stevioside, rebaudiosides A, B, C, D and E, and dulcosides A and B, are the main ingredients responsible for the sweet taste, of which, stevioside accounts for about 66% of the stevia glycosides, Rebaudioside A accounts for about 22%, rebaudioside C accounts for about 9%, dulcoside A accounts for about 2%, and the other glycosides are present in only trace amounts.

Ordinary stevia glycosides have certain drawbacks, one of which is a prolonged aftertaste. Among the stevia glycosides, Rebaudioside A has the highest sweetness level, at about 300 to 450 times the sweetness of sucrose, and without any undesirable aftertaste. Hence, Rebaudioside A is an ideal natural sweetener. However, other stevia glycosides have very similar chemical structures as they all share the same diterpene skeleton and slightly differ only in the types, quantities, and structural patterns of glycoside moieties. As a result, it is still difficult to obtain high purity Rebaudioside A at an industrial scale.

To date processes for preparing high purity Rebaudioside A include high-performance liquid chromatography, thin layer chromatography, drop counter-current chromatography, capillary electrophoresis, and supercritical fluid extraction. Due to small handling capacity and high cost, these processes are not suitable for industrial production.

Chinese Patent No. 1132840C discloses a method for purifying stevia glycosides through solid-liquid separation. In this process, stevia glycosides and ethanol are mixed at a ratio of 1:1.4-1.7 and dissolved with stirring. The resulting solution is subjected to solid-liquid separation, the solids and liquid obtained from which are decolorized and then dried to obtain purified stevia glycosides. The content of rebaudiosides in the stevia product obtained from this process is 88%, and the product still contains undesirable aftertaste and high levels of impurities.

Chinese Patent No. 1098860C discloses a process for separating enriched stevia glycosides through vacuum filtration and ion exchange resin. The process uses a crude stevia glycosides source material with a ratio of Rebaudioside A to stevioside ranging from 0.5 to 1.1. The crude stevia glycosides is dissolved by stirring the crude with an ethanol-water solvent. The mixture is then filtered to obtain a filtrate, the filtrate is desalinated with ion exchange resin and decolorized with active charcoal. The ethanol and water are evaporated to obtain a stevia product with a yield between 35 to 65% and with a ratio of Rebaudioside A to stevioside greater than 2.5. The content of stevia glycosides obtained by this process is greater than 95%, of which, the content of rebaudioside is equal or greater than 78%.

Chinese Patent No. 1078217C discloses a method for separating enriched Rebaudioside A through adsorption resins. The invention synthesizes a series of macroporous adsorption resins and uses the selective adsorption of macroporous adsorption resins to separate stevia glycosides, and through recrystallization, a stevia product containing 90% Rebaudioside A can be obtained.

Chinese Patent No. 1032651C discloses a method for purifying stevia glycosides through extraction. In this process, fatty alcohol or fatty alcohol plus diluent is used in a liquid-liquid extraction of crude stevia glycosides solution, after which water is used for reverse extraction. The extract obtained from the reverse extraction is then dried to obtain a product with a total content total stevia glycosides at 90%. This process consumes a large amount of test reagents and has poor separation, therefore making large scale production difficult.

Chinese Patent No. 1024348C discloses a process of extracting stevia glycosides through resins. This process includes steps such as soaking the dried stevia plant leaves, plate filtration, adsorption, desalination, decolorization with ordinary strongly alkaline resin, concentration and drying. The content of stevia glycosides in the product obtained from the process is 98%. The process has poor decolorization efficiency, however, and can even be poisonous during use.

Japanese Patent No. 07, 143, 860 discloses a method to manufacture high-content Rebaudioside A. This process uses water or aqueous solvent to extract stevia glycosides from the dried stems or leaves of stevia plant. After separation and collection, an extract with a Rebaudioside A content of 4.8 to 8.5 times the total amount of stevioside, rebaudioside C and dulcoside A can be obtained. Through further crystallization and recrystallization with ethanol containing 10 to 20% of water, a product with 90% Rebaudioside A can be obtained.

Japanese Patent No. 2002,262,822 discloses a sweetener extracted from dried leaves of stevia plants and its extraction method. This process uses water or aqueous solvent to extract stevia glycosides from the dried leaves. In the obtained product, the content of Rebaudioside A is 2.56 times the amount of stevioside.

United States Patent No. 20060134292 discloses a method of extracting sweet glycosides from *Stevia rebaudiana* Bertoni plants and obtaining Rebaudioside A and stevioside. The extraction is developed in the presence of pectinase, and is further purified using cyclodextrin and bentonite. Purified Rebaudioside A can be obtained by crystallization and recrystallization with ethanol. Purified stevioside can be obtained by purification with cyclodextrin, bentonite, and ion exchange resins. The enzymatic modification of the Rebaudioside A, stevioside and the purified extract is carried out using transferring enzymes derived from *Thermoactinomyces vilgaris* and *Bacillus halophilus*.

United States Patent No. 20060083838 discloses a method for producing a product with high contents of Rebaudioside A. This method uses an ethanol solvent and a stevia starting materials for reflux distillation. Then filtration is done to collect solid residues, which are then washed with ethanol with stirring and filtered again. The solid residues are collected, removed of ethanol and dried to obtain a product with a content of Rebaudioside A up to 99%.

United States Patent No. 20060083838 allegedly teaches a process of obtaining a product with a Rebaudioside A content of more than 99%, but such a result is not reproducible. Repeated trials showed the disclosed steps cannot adequately separate Rebaudioside A from other stevia glycosides, which have very similar structures.

SUMMARY OF THE INVENTION

The present invention provides a Rebaudioside A product having a purity of 99% or higher, and in high yield, and also purification methods for producing the same. According to one aspect of the invention, a method for producing purified Rebaudioside A comprises the steps of: providing a quantity of *Stevia rebaudiana* Bertoni; producing a crude extract by contacting the quantity of *Stevia rebaudiana* Bertoni with a first solvent; filtering the crude extract to obtain a filtrate feed; passing the filtrate feed over a polar resin and eluting with a second solvent to obtain an eluent containing at least about 65% Rebaudioside A on a dry weight basis; concentrating the eluent to obtain at least about 85% Rebaudioside A on a dry weight basis; and isolating the Rebaudioside A as dry crystals or as a solution.

In one embodiment of the present invention, a method for producing purified Rebaudioside A includes a countercurrent extraction method, for example, a continuous countercurrent extraction method. In another embodiment of the present invention, an ultrasonic extraction method is provided to obtain purified Rebaudioside A. Alternatively, the method includes a high pressure extraction method.

Other aspects of embodiments of the present invention are directed toward the use of solvents for extracting the *Stevia rebaudiana* Bertoni and eluting the crude extract, where the solvent can be water, alcohol, or a mixture thereof. In one embodiment, the solvent is ethanol. In another embodiment, the solvent is a mixture ethanol and water, with an ethanol-to-water ratio of from about 30% to 60%.

In another aspect of the invention, a method of isolating the eluent to obtain Rebaudioside A crystals is provided, and includes stirring the eluent for about 24 hours while the eluent is being first cooled at or below a freezing temperature of about −20° C. to obtain a crude crystalline-containing material, followed by stirring the crude crystalline-containing material for about another 24 hours, while cooling it a second to at or below a freezing temperature of about −20° C. to obtain a crystalline material, and then filtering the obtained crystalline material.

Another aspect of an embodiment of the present invention is directed toward a method of purifying Rebaudioside A using stevia glycosides as a starting material. The method includes separating the stevia glycosides by column chromatography to obtain a crude extract, contacting the crude extract with a solvent to form a mixture, and purifying the mixture to obtain Rebaudioside A crystals. In one embodiment, a silica gel column is used, and the crude extract is eluted with ethyl acetate and a water-ethanol mixed solvent.

In one embodiment, a purifying method of obtaining Rebaudioside A crystals includes contacting a crude extract with a solvent, for example, water, alcohol, or a mixture thereof. In one embodiment, a 4-10 vol % water-ethanol solvent is used at a ratio of one part of the crude extract solids to four parts solvent. The resulting solution is heated and stirred at 60° C. for about 1 to 4 hours, followed by stirring at −20° C. to allow crystallization for about 12 to 24 hours. The obtained crystalline material is then filtered to collect crystals and dried at 80° C. to obtain Rebaudioside A.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art will recognize, the invention can be embodied in many different forms and should not be construed as being limited to the embodiments set forth herein.

Diterpene glycosides, including sweet-tasting substances, are found in the stems, seeds, and leaves of the *S. rebaudiana* plant, and are present in the highest concentration in the leaves. The leaves, therefore, are the preferred starting material for recovery of diterpene glycosides from the *Stevia rebaudiana* Bertoni plant. Preferably, the starting material is removed of impurities by extraction with a solvent or other methods that do not strip or extract the diterpene glycosides from the starting material. Next, the plant material is subjected to a method of extraction and/or purification to obtain a highly purified product with over 99% content of Rebaudioside A.

According to one aspect of the invention, a method for producing purified Rebaudioside A comprises the steps of: providing a quantity of *Stevia rebaudiana* Bertoni; producing a crude extract by contacting the quantity of *Stevia rebaudiana* Bertoni with a first solvent; filtering the crude extract to obtain a filtrate feed; passing the filtrate feed over a polar resin and eluting with a second solvent to obtain an eluent containing at least about 65% Rebaudioside A on a dry weight basis; concentrating the eluent to obtain at least about 85% Rebaudioside A on a dry weight basis; and isolating the Rebaudioside A as dry, highly pure crystals, or as a solution.

Figure 1:
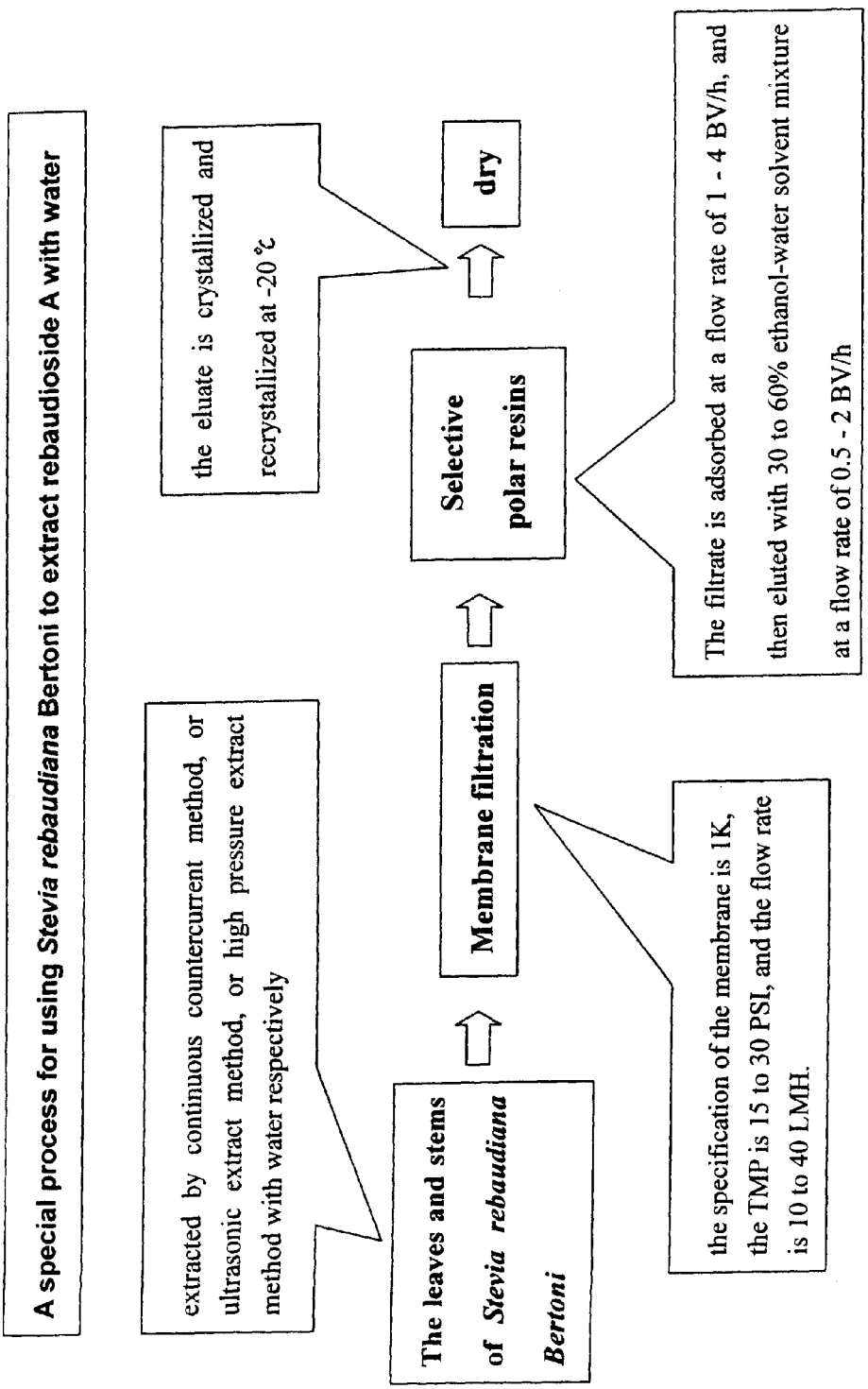
FIG. 1 is a flow chart schematically illustrating an aqueous extraction process for producing purified Rebaudioside A according an embodiment of the present invention.
Figure 2:
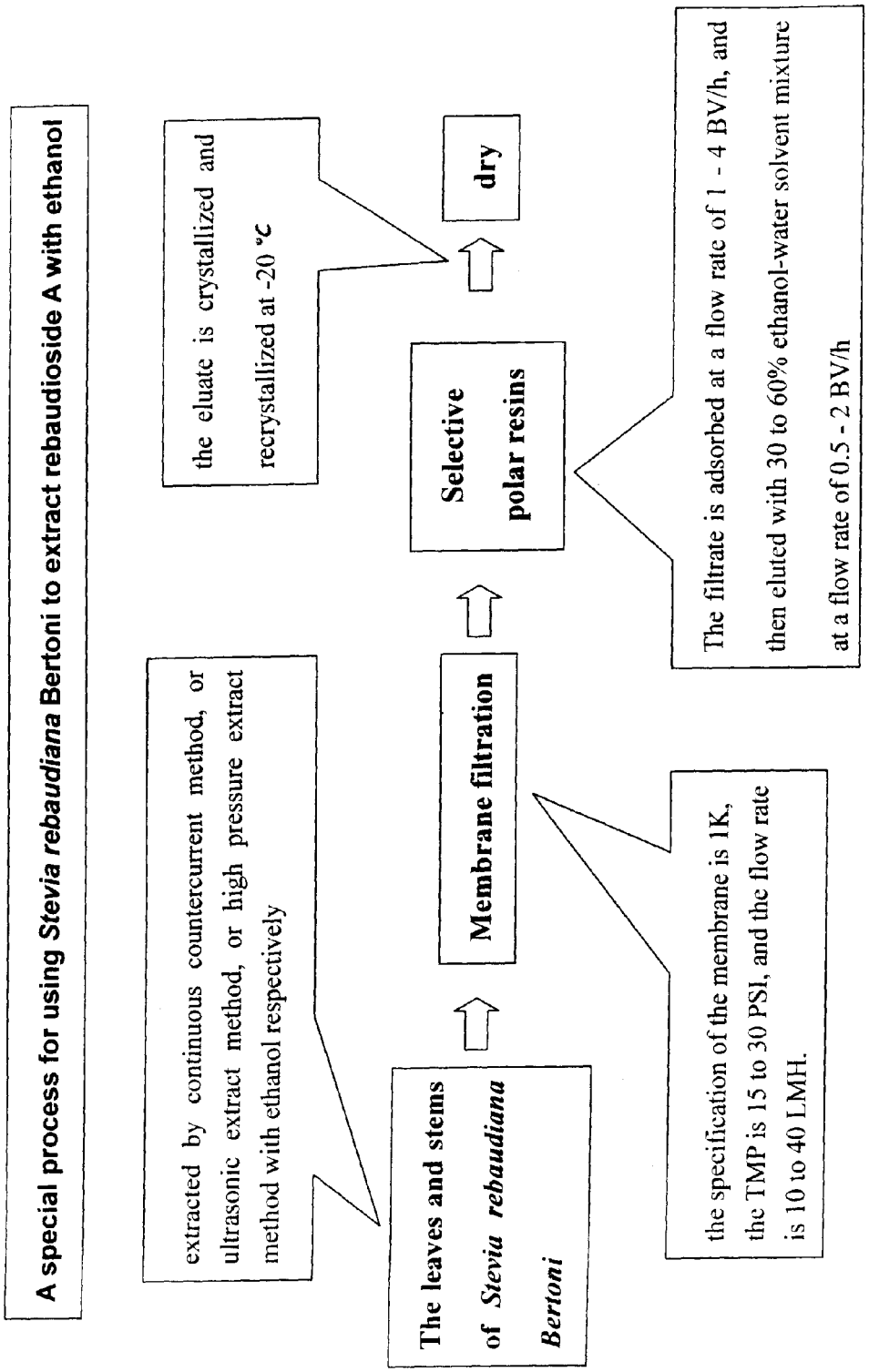
FIG. 2 is a flow chart schematically illustrating an alcoholic extraction process for producing purified Rebaudioside A according an embodiment of the present invention

An exemplary illustration of such a process is shown in FIGS. 1 and 2. Referring to FIG. 1, first, the leaves and stems of *Stevia rebaudiana* Bertoni plants are provided as a starting material. The starting material is then extracted for diterpene glycosides, which contain crude Rebaudioside A at a low concentration. Here, several methods of extraction can be used. In one embodiment, a countercurrent extraction method is employed. In another embodiment, a continuous countercurrent is provided to increase efficiency as well as to increase capacity of Rebaudioside A production. Alternatively, an ultrasonic extraction method and high pressure extraction method can also be employed.

For these extraction processes, a high polarity solvent such as water, alcohol, or a mixture thereof can be used to remove glycosides, including Rebaudioside A, from the plant material. The preferred solvents for this extraction are lower alkanols having from one to three carbon atoms, especially ethanol. Alternatively, the Rebaudioside A materials may be removed from the plant material by extraction with water or other more highly polar solvents, to provide a useful Rebaudioside A crude extract.

The extraction may be carried out in conventional ways, by contacting the plant material with the solvent for a period of time at ambient or elevated temperature. It is preferred that plant material be air dried before extraction, preferably by heating to a temperature of 50° C. to 80° C. for a period of 2 hours or less.

The plant material may be extracted in a continuous countercurrent method at a temperature of about 50° C. to 80° C. Preferably, at about 60° C. to 80° C., and more preferably at about 70° C. to 80° C. In one embodiment, a total mass of the plant material and a volume of the solvent is in a mass to volume ratio range of about 1:3 to 1:9. Preferably, the mass to volume ratio range is at about 1:5 to 1:9, and more preferably, at about 1:5 to 1:7. Additionally, the flow rate of the extracting solvent for every 1000 grams of the starting material may be from about 1 to 4 L/h. Preferably, at about 1 L/h to 3 L/h, and more preferably at about 1 L/h to 2 L/h.

Alternatively, the plant material can be extracted using ultrasonic extraction. In an ultrasonic extraction process, a solvent such as water, alcohol, or a mixture thereof can be used. In one embodiment, ethanol is preferred. In another embodiment, the operating condition of the ultrasonic extraction is provided. None-limiting examples of a power density employed in the ultrasonic extraction process ranges from about 0.2 to 0.5 W/cm. Preferably, the power density is at about 0.3 to 0.5 W/cm. More preferably, the power density is at about 0.3 to 0.4 W/cm. The operating ultrasonic frequency of about 15 to 30 KHz can be used. Although the preferred range is about 20 to 30 KHz, and more preferably, at a range of about 20 to 25 KHz. The extracting time range using the ultrasonic extract method according to various embodiments of the present invention ranges from 30 minutes to 120 minutes. It is preferred that the extraction time should take about 60 to 120 minutes, and more preferably, at about 90 to 120 minutes.

By optimizing the condition within the operating condition set forth above however, an extraction time of about 30 minutes is possible.

Alternatively, the extraction can be conducted under high pressure with an extraction solvent, including water and/or ethanol. Preferably, the plant material comprises mostly of leaves and stems of *Stevia rebaudiana* Bertoni, which are packed into a high pressure extracting device, such as an extraction column, with a mass (of solid) to volume (of solvent) ratio (m/v) of about 1:10 to about 1:40. A preferred range is from about 1:20 to 1:40, and, more preferably, about 1:20 to 1:30. In one embodiment, the column is vertically disposed and has a top opening for receiving the plant material and extraction solvent, and a bottom opening for discharging liquid extract. In one embodiment, the extraction column is operating under a pressure ranging from 2000 to 5000 MPA. The preferred range is about 2000 to 4000 MPA, and the more preferred range is about 200 to 3000 MPA.

According to one aspect of an embodiment of the present invention, the pressurized extraction is provided by feeding a highly pressured solvent into the column such that the required extraction time is in a range of about 10 to 40 minutes. In one embodiment, the extraction time is only about 10 to 30 minutes. In another embodiment, the extraction time is only about 10 to 20 minutes.

Referring back to FIG. 1, after passing the plant material through an extraction process, a liquid extract is obtained. The liquid extract is then concentrated to obtain a crude extract, which contains Rebaudioside A crystals. In one embodiment, the liquid extract is evaporated under an elevated temperature to obtain a crude extract. The crude extract is then dispersed with water and filtered through a filtering device to obtain a filtrate.

In one embodiment, as shown in FIG. 1, the filtering device is a membrane filtration. After the crude extract has been dispersed with water, it is then passed through a 1K membrane filtration unit under a total trans-membrane pressure (TMP) of about 15 to 30 PSI and at a flow rate of about 10 to 40 liter per square meter per hour (LMH). The filtrate obtained is then further extracted by passing through a bed of selective polar resins.

In one embodiment, the filtrate is passed through a column packed with selective polar resins to cause adsorption of a sweetness component Then, an eluent of ethanol-water mixture is passed through the column to cause elution of a sweetness component containing Rebaudioside A, and the eluate is then purified to obtain Rebaudioside A crystals. In one embodiment, the filtrate is absorbed with polar resins at a flow rate of about 1 to 4 bed volume per hour (BV/h). The preferred range is at about 1 to 3 BV/h, and the more preferred range is at about 1 to 2 BV/h. Then, an ethanol-water solvent at a concentration of about 30% to 60% of ethanol is passed through at a flow rate of about 0.5 to 2 BV/h, preferably at about 0.5 to 1.5 BV/h, and more preferably at about 0.5 to 1 BV/h. In various embodiments, an ethanol to water volume ratio range of about 40% to 60% is preferred. In yet other embodiments, an ethanol to water volume ratio range of about 50% to 60% is more preferred.

Figure 4:
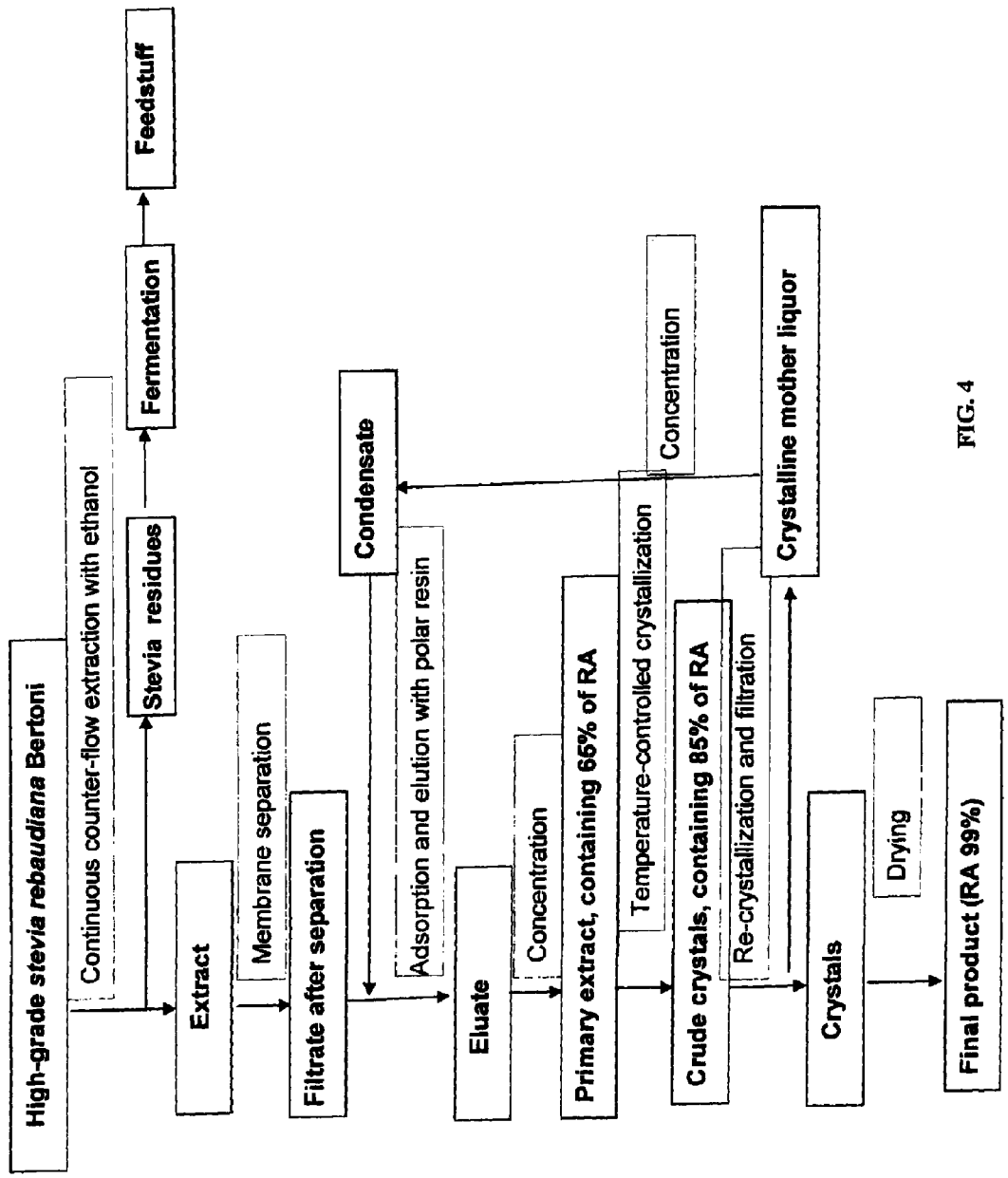
FIG. 4 is a flow chart schematically illustrating an ethanol-based extraction process for producing Rebaudioside A according to an embodiment of the present invention.

At this point, the eluent can be further concentrated and purified by, e.g., crystallization or distillation, and then dried to obtain highly purified Rebaudioside A crystals. An exemplary process for purifying the eluent to obtain purified Rebaudioside A crystals is shown in FIG. 4. Referring to FIG. 4, after the second extraction step of adsorption and elution in a polar resin bed, the obtained eluate can be further concentrated to obtain a concentrated eluent. In one embodiment, the concentrated eluent has a rebaudioside content of about 65%. Non limiting examples for concentrating processes includes concentration under reduced pressure, film concentration, freeze-drying and spray-drying.

The concentrated eluent is then subjected to crystallization, where the crystallization process is conducted at −20° C. with constant stirring for about 24 hours. The crude crystalline material obtained at this stage can be analyzed for Rebaudioside A content. In one embodiment, the Rebaudioside A content in a crude crystalline material obtained after one crystallization stage contains about 85% Rebaudioside A. Further recrystallization can be conducted to obtain higher concentration. In one embodiment, recrystallization is conducted again at a freezing temperature of about −20° C. with stirring for another 24 hours. The crystalline material obtained is then dried to obtain a final product, which has more than 99% Rebaudioside A.

The processes described above which include the steps of extraction with a polar resin, concentrating, crystallization, and recrystallization can be referred to as a purification cycle in accordance to the present invention.

In one embodiment, a recycle stream is provided, in which the crystalline material can be recycled back to the process before drying. The rerouted stream of crystalline material is concentrated using any conventional method or one of the concentrating methods described above, the condensate obtained is the feed back to join the filtrate stream and go through another purification cycle.

Figure 3:
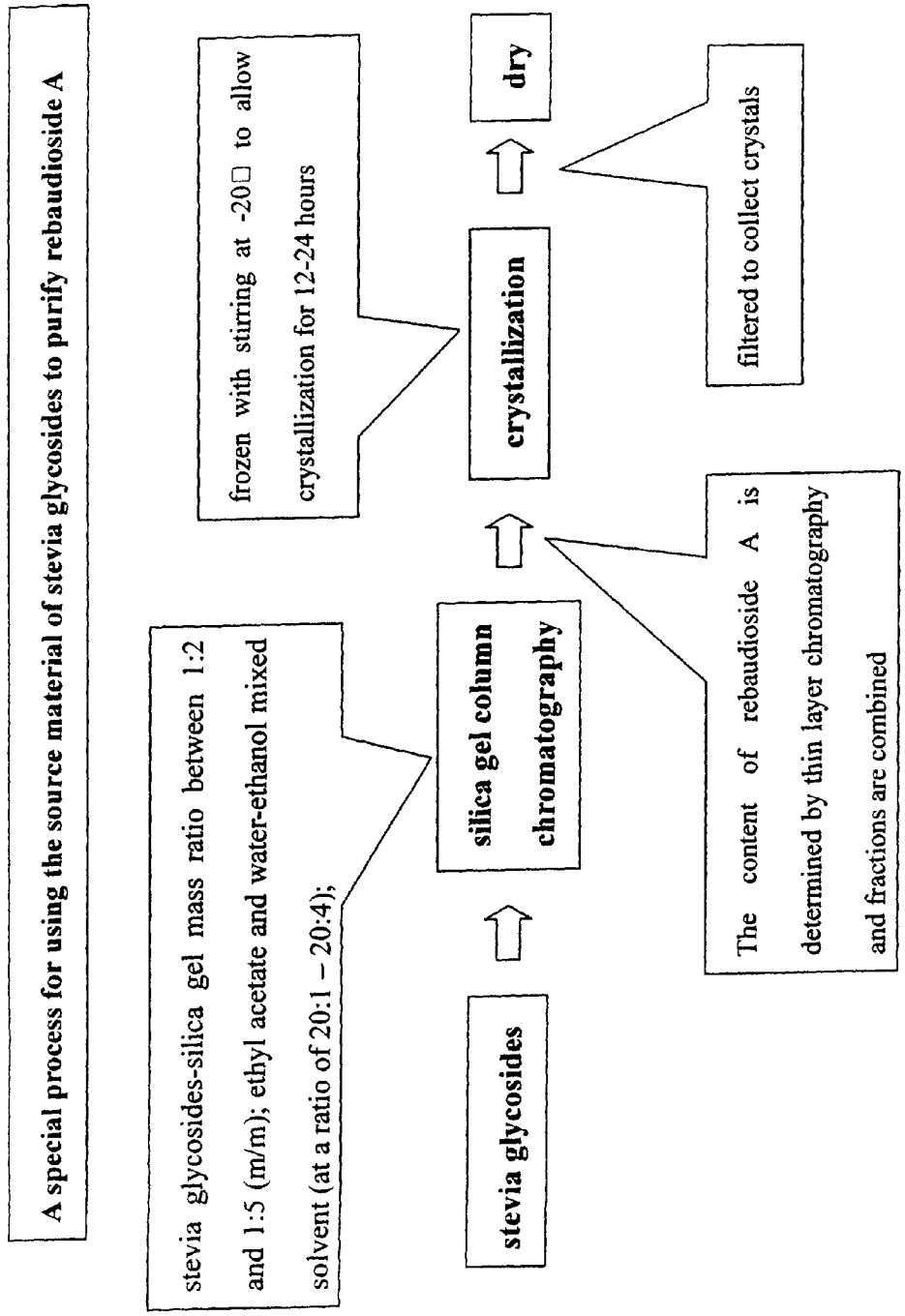
FIG. 3 is a flow chart schematically illustrating a silica gel column purification method according to an embodiment of the present invention.

Methods for producing highly purified Rebaudioside A are not limited to the above described processes, but, on the contrary, are intended to cover various modifications and equivalent arrangements, including certain steps of purification as shown in FIG. 3, and equivalents thereof.

According to an aspect of an embodiment of the present invention, another method of purifying Rebaudioside A is provided. The method comprises providing an amount of stevia glycosides, separating the stevia glycosides by column chromatography to obtain a crude extract, contacting the crude extract with a solvent to form a mixture, and purifying the mixture to obtain Rebaudioside A crystals.

Referring back to FIG. 3, stevia glycosides obtained from extraction by any conventional method or any of the above described method is separated by silica gel column chromatography. In packing the chromatography column, the amount of stevia glycosides and silica gel may be in mass ratio of about 1:2 to 1:5. Preferably, the mass ratio is about 1:3 to 1:5, and more preferably the ratios is in a range of about 1:4 to 1:5. The silica gel column is eluted with an ethyl acetate and water-ethanol solvent at a volume ratio of about 20:1 to 20:4. Preferably, the volume ratio is in a range of about 20:2 to 20:4, and more preferably, the volume ratio of ethyl acetate to water-ethanol mixed solvent is in a range of 20:2 to 20:3.

Fractions obtained from the column chromatography are then tested to determine the content of Rebaudioside A. In one embodiment, thin layer chromatography is use. Afterward, the fractions are combined and concentrated to obtain crude Rebaudioside A solids.

Next, the solids are subjected to a crystallization process. In this process, the solids are combined with a water-ethanol mixture solvent at a mass of solid to volume of solvent ratio of about 1:4. The resulting mixture is then heated while stirring at 60° C. for about 1 to 4 hours. Preferably, the heating and stirring process takes about 2 to 4 hours, and more preferably, for about 2 to 3 hours. The heated mixture is then stirred at a frozen condition. In one embodiment, the mixture is stirred at about −20° C. for about 12 hours to 24 hours to allow crystallization to occur. Preferably, the freeze stirring is conducted for about 16 to 24 hours. More preferably, it is conducted for about 20 to 24 hours. The obtained crystalline material is then dried at about 80° C. to obtain Rebaudioside A.

According to aspects of embodiments of the present invention, Rebaudioside A with a purity of more than 99% and a yield greater than 85% can be obtained. The Rebaudioside A obtained from such process has no undesirable aftertaste and can be used as a standalone sweetener. With high handling capacity and low cost, the said process is suitable for use in industrial production.

EXAMPLES

Embodiment 1 Influence of Stevia Glycosides to Silica Gel Ratio on Purification of 20% Rebaudioside A Four (4) 50.0 g stevia glycosides samples (each containing 20% Rebaudioside A) are extracted by silica gel column chromatography at stevia glycosides to silica gel mass ratios of 1:2, 1:3, 1:4 and 1:5 (m/m), respectively. The chromatography column is then eluted with a mixture of ethyl acetate, ethanol and water (mixed at a ratio of 10:1:0.1) to collect fractions respectively. After determined by thin layer chromatography, the Rebaudioside A fractions are combined and concentrated to obtain Rebaudioside A solids. The solids are then transferred into a 250 ml triangular flask, to which 5 vol % water-ethanol mixed solvent is added according to a ratio of 1:4 (m/v). The mixture is then heated at 60 C with stirring for 4 hours, after which the mixture is subjected to a freezing condition of −20 C while subjected to stirring to allow crystallization to occur. After 24 hours of crystallization, the obtained crystalline material is filter to collect crystals. The crystals are dried at 80 C to constant weight and weighed. Respective samples are withdrawn and tested for purity by high pressure liquid chromatography (HPLC method). Table 1 shows the results of the embodiments.

TABLE 1

Influence of the proportion of silica gel on purification of 20% Rebaudioside A

| Ratio of stevia glycosides to silica gel (m/m) | Weight of crystals (g) | Purity of Rebaudioside A | Yield |
| --- | --- | --- | --- |
| 1:2 | 7.73 | 98.02% | 75.8% |
| 1:3 | 7.77 | 98.56% | 76.6% |
| 1:4 | 8.25 | 99.23% | 81.9% |
| 1:5 | 8.28 | 99.24% | 82.2% |

The above experiment results indicate that through the purification process described in the present invention, Rebaudioside A with a purity of not less than 99% can be recovered through purification of stevia glycosides, and the optimal purification effect can be achieved when the mass ratio of stevia glycosides to silica gel is between 1:4 and 1:5.

While the present invention has been described in connection with certain specific content of Rebaudioside A and the specific ratio of stevia glycosides to silica gel, it is to be understood that the invention is not limited to the disclosed herein, but, on the contrary, is intended to cover various modifications and ranges, and equivalents thereof.

Embodiment 2 Influence of Stevia Glycosides to Silica Gel Ratio on Purification of 70% Rebaudioside A Stevia glycosides samples each containing 70% Rebaudioside A are purified with the process as set forth in Embodiment 1, and the results are listed in Table 2.

TABLE 2

Influence of the proportion of silica gel on purification of 70% Rebaudioside A.

| Ratio of stevia glycosides to silica gel (m/m) | Weight of crystals (g) | Purity of Rebaudioside A | Yield |
| --- | --- | --- | --- |
| 1:2 | 28.65 | 98.26% | 80.4% |
| 1:3 | 28.90 | 98.85% | 81.6% |
| 1:4 | 30.58 | 99.38% | 86.8% |
| 1:5 | 30.49 | 99.48% | 86.6% |

The above experiment results indicate that, through the purification process described in the present invention, Rebaudioside A with a purity of not less than 99% can be recovered through purification of stevia glycosides, and the optimal purification effect can be achieved when the mass ratio of stevia glycosides to silica gel is between 1:4 and 1:5.

Embodiment 3 Influence of Chromatographic Eluent Ratio on Purification of 20% Rebaudioside A Four (4) 50.0 g stevia glycosides samples, each containing 20% Rebaudioside A, are extracted by silica gel column chromatography respectively at stevia glycosides to silica gel mass ratio of 1:4 (m/m), and eluted with ethyl acetate and ethanol/water (10/1, v/v) mixed at a ratio from 20:1 to 20:4 (v/v) to collect fractions respectively. After determined by thin layer chromatography, the Rebaudioside A fractions are combined and concentrated to obtain Rebaudioside A solids. The solids are then transferred into a 250 ml triangular flask, to which 5% water-ethanol mixed solvent (v/v) according to a ratio of 1:4 (m/v) was added. The mixture is then heated at 60 C with stirring for 4 hours, after which mixture is subjected to a freezing condition at −20 C with stirring to allow crystallization to occur for 24 hours. The mixture is then filtered to collect crystals. The crystals are dried at 80° C. to constant weight and weighed. Respective samples are withdrawn and tested for purity by HPLC method. Table 3 show the results of the embodiment.

TABLE 3

Influence of chromatographic eluent ratio on purification of 20% Rebaudioside A.

| Ratio of ethyl acetate to ethanol/water (10/1) (v/v) | Weight of crystals (g) | Purity of Rebaudioside A | Yield |
|---|---|---|---|
| 20:1 | 8.17 | 97.27% | 79.7% |
| 20:2 | 8.26 | 99.24% | 82.0% |
| 20:3 | 8.16 | 99.25% | 81.0% |
| 20:4 | 7.74 | 99.25% | 76.8% |

The above experiment results indicate that, through the purification process described in the present invention, Rebaudioside A with a purity of not less than 99% can be recovered through purification of stevia glycosides, and the optimal purification effect can be achieved when the volume ratio of ethyl acetate to ethanol/water (10/1, v/v) is between 20:2 and 20:3.

Embodiment 4 Influence of Chromatographic Eluent Ratio on Purification of 70% Rebaudioside A Stevia glycosides samples containing 70% Rebaudioside A are purified with the process as set forth in Embodiment 3, and the results are listed in Table 4.

TABLE 4

Influence of chromatographic eluent ratio on purification of 70% Rebaudioside A.

| Ratio of ethyl acetate to ethanol/water (10/1) (v/v) | Weight of crystals (g) | Purity of Rebaudioside A | Yield |
|---|---|---|---|
| 20:1 | 29.32 | 98.42% | 82.5% |
| 20:2 | 30.53 | 99.39% | 86.7% |
| 20:3 | 30.24 | 99.41% | 85.9% |
| 20:4 | 28.28 | 99.49% | 80.4% |

The above experiment results indicate through the purification process described in the present invention, Rebaudioside A with a purity of not less than 99% can be recovered and the optimal purification effect can be achieved when the volume ratio of ethyl acetate to ethanol/water (10/1, v/v) is between 20:2 and 20:3.

Embodiment 5 Influence of Water to Ethanol Ratio on Purification of 20% Rebaudioside A A 200.0 g stevia glycosides sample (containing 20% Rebaudioside A) is extracted by silica gel column chromatography at a stevia glycosides to silica gel mass ratio of 1:4 (m/m), and eluted with the mixture of ethyl acetate, ethanol and water (10:1:0.1) to collect fractions respectively. After the content of the fractions are determined by thin layer chromatography, the Rebaudioside A fractions are combined and concentrated to obtain Rebaudioside A solids.

Six (6) portions of 5-g of the Rebaudioside A solids are put into six (6) 100 ml triangular flasks. 20 ml of ethanol solvent prepared with water and ethanol containing 0%, 2%, 4%, 6%, 8% and 10% (v/v) of water is then added to each flask. The flasks are then heated at 60 C with stirring for 4 hours. After which, they are subjected to a freezing condition at −20 C with stirring to allow crystallization for 24 hours. They are then filtered to collect crystals. The crystals are dried at 80 C to constant weight and weighed. Respective samples are withdrawn and tested for purity by HPLC method, and calculated according to the ratio. Table 5 shows the results of the embodiment.

TABLE 5

Influence of water to ethanol ratio on purification of 20% Rebaudioside A

| Water content of ethanol (v/v) | Weight of crystals (g) | Purity of Rebaudioside A | Yield |
|---|---|---|---|
| 0% | 3.14 | 90.61% | 81.4% |
| 2% | 3.06 | 92.52% | 80.8% |
| 4% | 2.94 | 96.73% | 81.3% |
| 6% | 2.87 | 99.26% | 81.7% |
| 8% | 3.05 | 99.31% | 86.5% |
| 10% | 2.24 | 99.58% | 63.6% |

The above experiment results indicate that, through the purification process described in the present invention, Rebaudioside A with purity not less than 99% can be recovered through purification of stevia glycosides, and the optimal purification effect can be achieved when the water content is between 6% and 8%.

Embodiment 6 Influence of Water to Ethanol Ratio on Purification of 70% Rebaudioside A A stevia glycosides sample containing 70% Rebaudioside A is purified with the process as set forth in Embodiment 5, and the results are listed in Table 6.

TABLE 6

Influence of water to ethanol ratio on purification of 70% Rebaudioside A

| Water content of ethanol (v/v) | Weight of crystals (g) | Purity of Rebaudioside A | Yield |
|---|---|---|---|
| 0% | 3.75 | 92.04% | 85.2% |
| 2% | 3.63 | 94.12% | 84.5% |
| 4% | 3.59 | 96.84% | 85.8% |
| 6% | 3.54 | 99.36% | 86.9% |
| 8% | 3.56 | 99.47% | 87.5% |
| 10% | 2.77 | 99.55% | 68.2% |

The above experiment results indicate that, through the purification process described in the present invention, Rebaudioside A with a purity of not less than 99% can be recovered and the optimal purification effect can be achieved when the water content is between 6% and 8%.

Embodiment 7 Influence of Water to Ethanol Ratio on Purification of 80% Rebaudioside A A stevia glycosides sample containing 80% Rebaudioside A is purified with the process as set forth in Embodiment 5, and the results are listed in Table 7.

TABLE 7

Influence of water to ethanol ratio on purification of 80% Rebaudioside A.

| Water content of ethanol (v/v) | Weight of crystals (g) | Purity of Rebaudioside A | Yield |
|---|---|---|---|
| 0% | 4.08 | 93.78% | 85.0% |
| 2% | 4.04 | 95.85% | 86.1% |
| 4% | 4.00 | 97.33% | 86.5% |
| 6% | 3.96 | 99.38% | 87.7% |
| 8% | 3.98 | 99.63% | 88.2% |
| 10% | 3.13 | 99.74% | 69.5% |

The above experiment results indicate that, through the purification process described in the present invention, Rebaudioside A with a purity of not less than 99% can be recovered and the optimal purification effect can be achieved when the water content is between 6% and 8%.

Embodiment 8 Influence of the Time of Stirred Heating on the Purification of 20% Rebaudioside A A 200.0 g stevia glycosides sample (containing 20% Rebaudioside A) is extracted by silica gel column chromatography at a stevia glycosides to silica gel mass ratio of 1:4 (m/m), and eluted with the mixture of ethyl acetate, ethanol and water (10:1:0.1) to collect fractions respectively. After the contents of the fractions are determined by thin layer chromatography, the Rebaudioside A fractions are combined and concentrated to obtain Rebaudioside A solids.

Four (4) 5.000 g portions of the Rebaudioside A solids are then transferred into four (4) 100 ml triangular flasks. To each flask, 20 ml of ethanol solvent containing 8% (v/v) of water is added. The flasks are shake and heated at 60° C. with stirring for 1, 2, 3 and 4 hours respectively. After which, the flasks are subjected to a freezing condition at −20° C. with stirring to allow crystallization to occur. After 24 hours, the content of each flask was filtered to collect crystals. The crystals are dried at 80° C. to constant weight and weighed. Respective samples are withdrawn and tested for purity by HPLC method, and calculated according to the ratio. Table 8 shows the results of the embodiment.

TABLE 8

Influence of the time of stirred heating on the purification of 20% Rebaudioside A.

| Stirred heating time (hour) | Weight of crystals (g) | Purity of Rebaudioside A | Yield |
|---|---|---|---|
| 1 | 3.00 | 97.36% | 83.4% |
| 2 | 2.97 | 99.21% | 84.6% |
| 3 | 3.01 | 99.23% | 85.2% |
| 4 | 2.94 | 99.24% | 83.3% |

The above experiment results indicate that, through the purification process described in the present invention, Rebaudioside A with a purity of not less than 99% can be recovered through purification of stevia glycosides, and the optimal purification effect can be achieved when the time of stirred heating is from 2 to 3 hours.

Embodiment 9 Influence of the Time of Stirred Heating on the Purification of 70% Rebaudioside A A stevia glycosides sample containing 70% Rebaudioside A is purified with the process as set forth in Embodiment 8, and the results are listed in Table 9.

TABLE 9

Influence of the time of stirred heating on the purification of 70% Rebaudioside A.

| Stirred heating time (hour) | Weight of crystals (g) | Purity of Rebaudioside A | Yield |
|---|---|---|---|
| 1 | 3.47 | 98.27% | 84.1% |
| 2 | 3.59 | 99.36% | 88.2% |
| 3 | 3.61 | 99.35% | 88.7% |
| 4 | 3.53 | 99.36% | 86.7% |

The above experiment results indicate that, through the purification process described in the present invention, Rebaudioside A with a purity of not less than 99% can be recovered through purification of stevia glycosides, and the optimal purification effect can be achieved when the time of stirred heating is from 2 to 3 hours.

Embodiment 10 Influence of the Time of Stirred Heating on the Purification of 80% Rebaudioside A A stevia glycosides sample containing 80% Rebaudioside A is purified with the process as set forth in Embodiment 8, and the results are listed in Table 10.

TABLE 10

Influence of the time of stirred heating on the purification of 80% Rebaudioside A.

| Stirred heating time (hour) | Weight of crystals (g) | Purity of Rebaudioside A | Yield |
|---|---|---|---|
| 1 | 3.97 | 98.45% | 86.8% |
| 2 | 4.03 | 99.62% | 89.3% |
| 3 | 4.05 | 99.64% | 89.8% |
| 4 | 3.98 | 99.65% | 88.3% |

The above experiment results indicate that, through the purification process described in the present invention, Rebaudioside A with a purity of not less than 99% can be recovered through purification of stevia glycosides, and the optimal purification effect can be achieved when the time of stirred heating is from 2 to 3 hours.

Embodiment 11 Influence of the Time of Stirred Freezing and Crystallization on the Purification of 20% Rebaudioside A A 200.0 g sample of stevia glycosides (containing 20% Rebaudioside A) is extracted by silica gel column chromatography at a stevia glycosides to silica gel mass ratio of 1:4 (m/m), and eluted with a mixture of ethyl acetate, ethanol and water (10:1:0.1) to collect fractions respectively. After the content of the fractions determined by thin layer chromatography, the Rebaudioside A fractions are combined and concentrated to obtain Rebaudioside A solids.

Four (4) 5.000 g portions of the Rebaudioside A are then transferred into four (4) 100 ml triangular flasks. Then 20 ml of ethanol solvent containing 8% (v/v) of water is added to each flask. The flasks are shaken and heated at 60° C. with stirring for 3 hours. After which, they are subjected to a freezing condition at −20° C. with stirring for 12, 16, 20 and 24 hours respectively, to allow crystallization to occur. The obtained crystalline-containing materials are then filtered to collect crystals. The crystals are dried at 80° C. to constant weight and weighed. Respective samples are withdrawn and tested for purity by HPLC method, and calculated according to the ratio. Table 11 shows the results of the embodiment.

TABLE 11

Influence of the time of stirred freezing and crystallization on the purification of 20% Rebaudioside A.

| stirred freezing and crystallization time (hour) | Weight of crystals (g) | Purity of Rebaudioside A | Yield |
| --- | --- | --- | --- |
| 12 | 2.79 | 99.19% | 79.2% |
| 16 | 2.87 | 99.21% | 81.8% |
| 20 | 3.00 | 99.23% | 85.3% |
| 24 | 3.01 | 99.24% | 85.5% |

The above experiment results indicate that, through the purification process described in the present invention, Rebaudioside A with a purity of not less than 99% can be recovered through purification of stevia glycosides, and the optimal purification effect can be achieved when the time of stirred freezing and crystallization is from 20 to 24 hours.

Embodiment 12 Influence of the Time of Stirred Freezing and Crystallization on the Purification of 70% Rebaudioside A A stevia glycosides sample containing 70% Rebaudioside A is purified with the process as set forth in Embodiment 11, and the results are listed in Table 12.

TABLE 12

Influence of the time of stirred freezing and crystallization on the purification of 70% Rebaudioside A.

| stirred freezing and crystallization time (hour) | Weight of crystals (g) | Purity of Rebaudioside A | Yield |
| --- | --- | --- | --- |
| 12 | 3.32 | 99.33% | 81.5% |
| 16 | 3.45 | 99.35% | 84.7% |
| 20 | 3.61 | 99.37% | 88.7% |
| 24 | 3.62 | 99.36% | 88.9% |

The above experiment results indicate that, through the purification process described in the present invention, Rebaudioside A with a purity of not less than 99% can be recovered through purification of stevia glycosides, and the optimal purification effect can be achieved when the time of stirred freezing and crystallization is from 20 to 24 hours.

Embodiment 13 Influence of the Time of Stirred Freezing and Crystallization on the Purification of 80% Rebaudioside A A stevia glycosides sample containing 80% Rebaudioside A is purified with the process as set forth in Embodiment 11, and the results are listed in Table 13.

TABLE 13

Influence of the time of stirred freezing and crystallization on the purification of 80% Rebaudioside A.

| stirred freezing and crystallization time (hour) | Weight of crystals (g) | Purity of Rebaudioside A | Yield |
| --- | --- | --- | --- |
| 12 | 3.55 | 99.55% | 78.4% |
| 16 | 3.80 | 99.58% | 84.2% |
| 20 | 4.04 | 99.64% | 89.6% |
| 24 | 4.05 | 99.63% | 89.8% |

The above experiment results indicate that, through the purification process described in the present invention, Rebaudioside A with a purity of not less than 99% can be recovered through purification of stevia glycosides, and the optimal purification effect can be achieved when the time of stirred freezing and crystallization is from 20 to 24 hours.

Embodiment 14 Purification of 90% Rebaudioside A

A 40.0 g stevia glycosides sample (containing 90% Rebaudioside A) is extracted by silica gel column chromatography at stevia glycosides to silica gel mass ratio of 1:4 (m/m), and eluted with the mixture of ethyl acetate, ethanol and water (10:1:0.1) to collect fractions respectively. After the content of the fractions are determined by thin layer chromatography, the Rebaudioside A fractions are combined and concentrated to obtain Rebaudioside A crystals. The crystals are dried at 80° C. to a constant weight and weighed. Respective samples are withdrawn and tested for purity by HPLC method. This embodiment harvested 33.32 g of Rebaudioside A with 99.46% purity, and the yield is 92.2%.

The above experiment results indicate that, through the part of the purification process described in the present invention, Rebaudioside A with a purity of not less than 99% can also be recovered through purification of stevia glycosides.

Embodiment 15 Purification of 95% Rebaudioside A

A 50.00 g sample of stevia glycosides (containing 90% Rebaudioside A) is transferred into a 100 ml triangular flask, to which 200 ml of ethanol solvent containing 8% (v/v) of water is added. The flask is heated with stirring at 60° C. for 2.5 hours, and then it is subjected to a freezing condition with stirring at −20° C. for 22 hours to allow crystallization to occur. The obtained crystalline material is then filtered to collect crystals. The crystals are dried at 80° C. to a constant weight and weighed. Samples are collected and tested for purity by HPLC method. This embodiment produced 45.63 g of Rebaudioside A with 99.65% purity, and the yield is 95.7%.

The above experiment results indicate that, through the part of the purification process described in the present invention, Rebaudioside A with purity not less than 99% can also be recovered through purification of stevia glycosides.

Embodiment 16a Influence of the Ratio of Stevia Plant Materials to Ethanol on Continuous Countercurrent Extraction Based on mass-volume ratios of 1:3, 1:5, 1:7 and 1:9 (m/v), 10 kg-sample of the dried leaves and stems (containing 8% Rebaudioside A) of *Stevia rebaudiana* Bertoni plant and ethanol are put under continuous countercurrent extraction at 70° C. The flow rate of ethanol against each 1,000 grams of stevia plant materials is 2 L/h.

The volume of the extracts is measured and evaporated to dryness. It is further allowed to dry to a constant weight and weighed. The samples are then obtained and tested for purity by HPLC method. Table 16a shows the experimental results.

TABLE 16a

Influence of the ration of stevia plant materials to ethanol on continuous countercurrent extraction.

| Ratio of stevia plant materials to solvent (m/v) | Total weight of the extract (kg) | Content of Rebaudioside A | Extraction conversion rate |
|---|---|---|---|
| 1:3 | 3.12 | 22.0% | 85.8% |
| 1:5 | 3.45 | 22.5% | 97.0% |
| 1:7 | 3.46 | 22.5% | 97.3% |
| 1:9 | 3.65 | 21.3% | 97.2 |

Embodiment 16b Influence of the Ratio of Stevia Plant Materials to Water on Continuous Countercurrent Extraction Based on mass-volume ratios of 1:3, 1:5, 1:7 and 1:9 (m/v), 10 kg-sample of the dried leaves and stems (containing 8% Rebaudioside A) of *Stevia rebaudiana* Bertoni plant and water are put under continuous countercurrent extraction at 70° C. The flow rate of water against each 1,000 grams of stevia plant materials is 2 L/h.

The volume of the extracts is measured and evaporated to dryness. It is further allowed to dry to a constant weight and weighed. The samples are then obtained and tested for purity by HPLC method. Table 16 shows the experimental results.

TABLE 16

Influence of the ration of stevia plant materials to water on continuous countercurrent extraction.

| Ratio of stevia plant materials to solvent (m/v) | Total weight of the extract (kg) | Content of Rebaudioside A | Extraction conversion rate |
|---|---|---|---|
| 1:3 | 2.85 | 24.1% | 86.0% |
| 1:5 | 3.19 | 24.4% | 97.3% |
| 1:7 | 3.21 | 24.3% | 97.5% |
| 1:9 | 3.21 | 24.3% | 97.5% |

The above experiment results indicate that, in the continuous countercurrent extraction of the stevia plant materials, the optimal extraction effect can be achieved when the ratio of stevia plant materials to water is between 1:5 and 1:7.

Embodiment 17a Influence of the Extraction Temperature on Continuous Countercurrent Extraction with Ethanol Based on a mass-volume ratio of 1:6 (m/v), a 10 kg-sample of the dried leaves and stems of *Stevia rebaudiana* Bertoni plant and ethanol are put under continuous countercurrent extraction at 50° C., 60° C., 70° C. and 80° C., respectively. The flow rate of ethanol against each 1,000 grams of stevia plant materials is 2 L/h.

The volume of the extracts is measured and evaporated to dryness. It is further allowed to dry to a constant weight and weighed. The samples are then obtained and tested for purity by HPLC method. Table 17a shows the experimental results.

TABLE 17a

Influence of the extraction temperature on continuous countercurrent extraction with ethanol.

| Extraction temperature (° C.) | Total weight of extract (kg) | Content of Rebaudioside A | Extraction conversion rate |
|---|---|---|---|
| 50° C. | 2.89 | 24.3% | 87.9% |
| 60° C. | 3.22 | 23.0% | 92.8% |
| 70° C. | 3.45 | 22.5% | 97.0% |
| 80° C. | 3.46 | 22.5% | 97.3% |

The above experiment results indicate that, in the continuous countercurrent extraction of the stevia plant materials, the optimal extraction effect can be achieved when the extraction temperature is between 70° C. and 80° C.

Embodiment 17b Influence of the Extraction Temperature on Continuous Countercurrent Extraction with Water Based on a mass-volume ratio of 1:6 (m/v), a 10 kg-sample of the dried leaves and stems of *Stevia rebaudiana* Bertoni plant and water are put under continuous countercurrent extraction at 50° C., 60° C., 70° C. and 80° C., respectively. The flow rate of water against each 1,000 grams of stevia plant materials is 2 L/h.

The volume of the extracts is measured and evaporated to dryness. It is further allowed to dry to a constant weight and weighed. The samples are then obtained and tested for purity by HPLC method. Table 17b shows the experimental results.

TABLE 17b

Influence of the extraction temperature on continuous countercurrent extraction with water.

| Extraction temperature (° C.) | Total weight of extract (kg) | Content of Rebaudioside A | Extraction conversion rate |
|---|---|---|---|
| 50° C. | 2.92 | 25.5% | 93.2% |
| 60° C. | 3.08 | 24.7% | 95.1% |
| 70° C. | 3.20 | 24.3% | 97.2% |
| 80° C. | 3.21 | 24.3% | 97.5% |

The above experiment results indicate that, in the continuous countercurrent extraction of the stevia plant materials, the optimal extraction effect can be achieved when the extraction temperature is between 70° C. and 80° C.

The present invention is not limited to the specific content of Rebaudioside A and the specific extraction temperature as set forth in this embodiment.

Embodiment 18a Influence of the Extraction Flow Rate on Continuous Countercurrent Extraction with Ethanol Based on a mass-volume ratio of 1:6 (m/v), a 10 kg-sample of the dried leaves and stems of *Stevia rebaudiana* Bertoni plant and ethanol are put under continuous countercurrent extraction at 70° C. The flow rate of the ethanol mixed solvent against each 1,000 grams of stevia plant materials is 1, 2, 3 and 4 L/h, respectively.

The volume of the extracts is measured and evaporated to dryness. It is further allowed to dry to a constant weight and weighed. The samples are then obtained and tested for purity by HPLC method. Table 18 shows the experimental results.

TABLE 18a

Influence of the extraction flow rate on continuous countercurrent extraction with ethanol.

| Extraction flow rate (L/h) | Total weight of extract (kg) | Content of Rebaudioside A | Extraction conversion rate |
|---|---|---|---|
| 1 | 3.44 | 22.6% | 97.2% |
| 2 | 3.45 | 22.6% | 97.3% |
| 3 | 3.26 | 22.8% | 93.1% |
| 4 | 3.07 | 23.5% | 90.1% |

The above experiment results indicate that, in the continuous countercurrent extraction of the stevia plant materials, the optimal extraction effect can be achieved when the extraction flow rate against each 1,000 grams of stevia plant materials is between 1 and 2 L/h.

Embodiment 18b Influence of the Extraction Flow Rate on Continuous Countercurrent Extraction with Water Based on a mass-volume ratio of 1:6 (m/v), a 10 kg-sample of the dried leaves and stems of *Stevia rebaudiana* Bertoni plant and water are put under continuous countercurrent extraction at 70° C. The flow rate of the water mixed solvent against each 1,000 grams of stevia plant materials is 1, 2, 3 and 4 L/h, respectively.

The volume of the extracts is measured and evaporated to dryness. It is further allowed to dry to a constant weight and weighed. The samples are then obtained and tested for purity by HPLC method. Table 18b shows the experimental results.

TABLE 18b

Influence of extraction flow rate on continuous countercurrent extraction with water.

| Extraction flow rate (L/h) | Total weight of extract (kg) | Content of Rebaudioside A | Extraction conversion rate |
|---|---|---|---|
| 1 | 3.20 | 24.3% | 97.2% |
| 2 | 3.21 | 24.3% | 97.5% |
| 3 | 3.21 | 24.3% | 97.5% |
| 4 | 3.21 | 24.3% | 97.5% |

The above experiment results indicate that, in the continuous countercurrent extraction of the stevia plant materials, the optimal extraction effect can be achieved when the extraction flow rate against each 1,000 grams of stevia plant materials is between 1 and 2 L/h.

The present invention is not limited to the specific content of Rebaudioside A and the specific extraction flow rate of water against each 1,000 grams of stevia plant materials as set forth in this embodiment.

Embodiment 19a Influence of Extract Power Density on Ultrasonic Extraction with Ethanol Based on a mass-volume ratio of 1:6 (m/v), 10 kgs of the dried leaves and stems (containing 8% Rebaudioside A) of *Stevia rebaudiana* Bertoni plant and ethanol are put under ultrasonic extraction with an extract power density ranging from 0.2 to 0.5 W/cm, a frequency of 20 kHz, and an extract time of 60 minutes.

The volume of the extracts is measured and evaporated to dryness. It is further allowed to dry to a constant weight and weighed. The samples are then obtained and tested for purity by HPLC method. Table 19a shows the experimental results.

TABLE 19a

Influence of the extract power density on ultrasonic extraction with ethanol.

| extract power density (W/cm) | Total weight of extract (kg) | Content of Rebaudioside A | Extraction conversion rate |
|---|---|---|---|
| 0.2 | 2.94 | 24.9% | 91.5% |
| 0.3 | 3.12 | 24.3% | 94.8% |
| 0.4 | 3.12 | 24.3% | 94.8% |
| 0.5 | 3.14 | 24.2% | 94.9% |

The above experiment results indicate that, in the ultrasonic extraction of the stevia plant materials, the optimal extraction effect can be achieved when the ultrasonic extract power density between 0.3 and 0.4.

Embodiment 19b Influence of the Extract Power Density on Ultrasonic Extraction with Water Based on a mass-volume ratio of 1:6 (m/v), 10 kgs of the dried leaves and stems (containing 8% Rebaudioside A) of *Stevia rebaudiana* Bertoni plant and water are put under ultrasonic extraction with an extract power density ranging from 0.2 to 0.5 W/cm, a frequency of 20 kHz, and an extract time of 60 minutes.

The volume of the extracts is measured and evaporated to dryness. It is further allowed to dry to a constant weight and weighed. The samples are then obtained and tested for purity by HPLC method. Table 19b shows the experimental results.

TABLE 19b

Influence of the extract power density on ultrasonic extraction with water.

| extract power density (W/cm) | Total weight of extract (kg) | Content of Rebaudioside A | Extraction conversion rate |
|---|---|---|---|
| 0.2 | 2.95 | 25.1% | 92.5% |
| 0.3 | 3.08 | 24.7% | 95.2% |
| 0.4 | 3.10 | 24.6% | 95.3% |
| 0.5 | 3.10 | 24.6% | 95.3% |

The above experiment results indicate that, in the ultrasonic extraction of the stevia plant materials, the optimal extraction effect can be achieved when the ultrasonic extract power density is between 0.3 and 0.4.

Embodiment 20a Influence of the Extract Frequency on Ultrasonic Extraction with Ethanol Based on a mass-volume ratio of 1:6 (m/v), a 10 kg-sample of the dried leaves and stems (containing 8% Rebaudioside A) of *Stevia rebaudiana* Bertoni plant and ethanol are put under ultrasonic extraction with a frequency ranging from 15 to 30 KHz, an extract power density of 0.3 W/cm, and an extract time of 60 minutes.

The volume of the extracts is measured and evaporated to dryness. It is further allowed to dry to a constant weight and weighed. The samples are then obtained and tested for purity by HPLC method. Table 20a shows the experimental results.

TABLE 20a

Influence of the extract frequency on ultrasonic extraction.

| extract frequency (KHz) | Total weight of extract (kg) | Content of Rebaudioside A | Extraction conversion rate |
| --- | --- | --- | --- |
| 15 | 2.97 | 24.7% | 91.8% |
| 20 | 3.12 | 24.3% | 94.8% |
| 25 | 3.12 | 24.3% | 94.8% |
| 30 | 3.12 | 24.3% | 94.8% |

The above experiment results indicate that, in the ultrasonic extraction of the stevia plant materials, the optimal extraction effect can be achieved when the extract frequency is between 20 and 25 kHz.

Embodiment 20b Influence of the Extract Frequency on Ultrasonic Extraction with Water Based on a mass-volume ratio of 1:6 (m/v), a 10 kg-sample of dried leaves and stems (containing 8% Rebaudioside A) of Stevia rebaudiana Bertoni plant and water are put under ultrasonic extraction with a frequency ranging from 15 to 30 KHz, an extract power density of 0.3 W/cm, and an extract time of 60 minutes.

The volume of the extracts is measured and evaporated to dryness. It is further allowed to dry to a constant weight and weighed. The samples are then obtained and tested for purity by HPLC method. Table 20b shows the experimental results.

TABLE 20b

Influence of the extract frequency on ultrasonic extraction with water.

| extract frequency (KHz) | Total weight of extract (kg) | Content of Rebaudioside A | Extraction conversion rate |
| --- | --- | --- | --- |
| 15 | 2.94 | 25.2% | 92.6% |
| 20 | 3.07 | 24.8% | 95.3% |
| 25 | 3.10 | 24.6% | 95.3% |
| 30 | 3.10 | 24.6% | 95.3% |

The above experiment results indicate that, in the ultrasonic extraction of the stevia plant materials, the optimal extraction effect can be achieved when the extract frequency is between 20 and 25 kHz.

Embodiment 21a Influence of the Extract Time on Ultrasonic Extraction with Ethanol Based on a mass-volume ratio of 1:6 (m/v), a 10 kg-sample of dried leaves and stems (containing 8% Rebaudioside A) of Stevia rebaudiana Bertoni plant and ethanol are put under ultrasonic extraction with an extract time ranging from 30 to 60 minutes, at a frequency of 20 kHz, and an extract power density of 0.3 W/cm.

The volume of the extracts is measured and evaporated to dryness. It is further allowed to dry to a constant weight and weighed. The samples are then obtained and tested for purity by HPLC method. Table 21a shows the experimental results.

TABLE 21a

Influence of the extract time on ultrasonic extraction with ethanol.

| extract time (minutes) | Total weight of extract (kg) | Content of Rebaudioside A | Extraction conversion rate |
| --- | --- | --- | --- |
| 30 | 2.78 | 25.5% | 88.6% |
| 60 | 2.95 | 24.4% | 89.9% |
| 90 | 3.12 | 24.3% | 94.8% |
| 120 | 3.12 | 24.3% | 94.8% |

The above experiment results indicate that, in the ultrasonic extraction of the stevia plant materials, the optimal extraction effect can be achieved when the extract time is between 90 and 120 minutes.

Embodiment 21b Influence of the Extract Time on Ultrasonic Extraction with Water Based on a mass-volume ratio of 1:6 (m/v), a 10 kg-sample of dried leaves and stems (containing 8% Rebaudioside A) of Stevia rebaudiana Bertoni plant and water are put under ultrasonic extraction with an extract time ranging from 30 to 60 minutes, at a frequency of 20 kHz, and an extract power density of 0.3 W/cm.

The volume of the extracts is measured and evaporated to dryness. It is further allowed to dry to a constant weight and weighed. The samples are then obtained and tested for purity by HPLC method. Table 21b shows the experimental results.

TABLE 21b

Influence of the extract time on ultrasonic extraction with water.

| extract time (minutes) | Total weight of extract (kg) | Content of Rebaudioside A | Extraction conversion rate |
| --- | --- | --- | --- |
| 30 | 2.87 | 25.1 | 90.2 |
| 60 | 2.96 | 24.9 | 92.2 |
| 90 | 3.12 | 24.7 | 95.2 |
| 120 | 3.12 | 24.6 | 95.3 |

The above experiment results indicate that, in the ultrasonic extraction of the stevia plant materials, the optimal extraction effect can be achieved when the extract time is between 90 and 120 minutes.

Embodiment 22a Influence of the Extract Time on High Pressure Extraction with Ethanol Based on a mass-volume ratio of 1:20 (m/v), a 10 kg-sample of dried leaves and stems (containing 8% Rebaudioside A) of Stevia rebaudiana Bertoni plant and ethanol are put under high pressure extraction with an extract time from 10 to 40 minutes, and an extract pressure of 3000 MPa.

The volume of the extracts is measured and evaporated to dryness. It is further allowed to dry to a constant weight and weighed. The samples are then obtained and tested for purity by HPLC method. Table 22a shows the experimental results.

TABLE 22a

Influence of the extract time on high pressure extraction with ethanol.

| extract time (minutes) | Total weight of extract (kg) | Content of Rebaudioside A | Extraction conversion rate |
| --- | --- | --- | --- |
| 10 | 3.04 | 24.8% | 94.2% |
| 20 | 3.05 | 24.9% | 94.9% |

TABLE 22a-continued

Influence of the extract time on high
pressure extraction with ethanol.

| extract time (minutes) | Total weight of extract (kg) | Content of Rebaudioside A | Extraction conversion rate |
| --- | --- | --- | --- |
| 30 | 3.05 | 24.9% | 94.9% |
| 40 | 3.05 | 24.9% | 94.9% |

The above experiment results indicate that, in the high pressure extraction of the stevia plant materials, the optimal extraction effect can be achieved when the extract time is between 10 and 20 minutes.

Embodiment 22b Influence of the Extract Time on
High Pressure Extraction with Water Based on a mass-volume ratio of 1:20 (m/v), a 10 kg-sample of dried leaves and stems (containing 8% Rebaudioside A) of *Stevia rebaudiana* Bertoni plant and water are put under high pressure extraction with an extract time from 10 to 40 minutes, and an extract pressure of 3000 MPa.

The volume of the extracts is measured and evaporated to dryness. It is further allowed to dry to a constant weight and weighed. The samples are then obtained and tested for purity by HPLC method. Table 22b shows the experimental results.

TABLE 22b

Influence of the extract time on high
pressure extraction with water.

| extract time (minutes) | Total weight of extract (kg) | Content of Rebaudioside A | Extraction conversion rate |
| --- | --- | --- | --- |
| 10 | 3.02 | 25.1% | 94.7% |
| 20 | 3.03 | 25.0% | 94.8% |
| 30 | 3.03 | 25.0% | 94.8% |
| 40 | 3.03 | 25.0% | 94.8% |

The above experiment results indicate that, in the high pressure extraction of the stevia plant materials, the optimal extraction effect can be achieved when the extract time is between 10 and 20 minutes.

Embodiment 23a Influence of the Mass-Volume
Ratio on High Pressure Extraction with Ethanol A 10 kg-sample of dried leaves and stems (containing 8% Rebaudioside A) of *Stevia rebaudiana* Bertoni plant and ethanol are put under high pressure extraction with a mass-to-volume ratio of 1:10 to 1:40 (m/v), an extract time of 30 minutes, and an extract pressure of 3000 MPa.

The volume of the extracts is then measured and evaporated to dryness. It is further allowed to dry to a constant weight and weighed. The samples are then obtained and tested for purity by HPLC method. Table 23a shows the experimental results.

TABLE 23a

Influence of the mass-volume ratio on
high pressure extraction with ethanol.

| mass-volume ratio (m/v) | Total weight of extract (kg) | Content of Rebaudioside A | Extraction conversion rate |
| --- | --- | --- | --- |
| 1:10 | 2.81 | 25.3% | 88.9% |
| 1:20 | 3.05 | 24.8% | 94.5% |

TABLE 23a-continued

Influence of the mass-volume ratio on
high pressure extraction with ethanol.

| mass-volume ratio (m/v) | Total weight of extract (kg) | Content of Rebaudioside A | Extraction conversion rate |
| --- | --- | --- | --- |
| 1:30 | 3.06 | 24.9% | 95.2% |
| 1:40 | 3.06 | 24.9% | 95.2% |

The above experiment results indicate that, in the high pressure extraction of the stevia plant materials, the optimal extraction effect can be achieved when the mass-volume ratio is between 1:20 and 1:30.

Embodiment 23b Influence of the Mass-Volume
Ratio on High Pressure Extraction with Water A 10 kg-sample of dried leaves and stems (containing 8% Rebaudioside A) of *Stevia rebaudiana* Bertoni plant and water are put under high pressure extraction with a mass-to-volume ratio of 1:10 to 1:40 (m/v), an extract time of 30 minutes, and an extract pressure of 3000 MPa.

The volume of the extracts is then measured and evaporated to dryness. It is further allowed to dry to a constant weight and weighed. The samples are then obtained and tested for purity by HPLC method. Table 23b shows the experimental results.

TABLE 23b

Influence of the mass-volume ratio on
high pressure extraction with water.

| mass-volume ratio (m/v) | Total weight of extract (kg) | Content of Rebaudioside A | Extraction conversion rate |
| --- | --- | --- | --- |
| 1:10 | 2.75 | 25.3% | 88.7% |
| 1:20 | 3.02 | 24.8% | 94.7% |
| 1:30 | 3.03 | 24.9% | 94.8% |
| 1:40 | 3.03 | 24.9% | 94.8% |

The above experiment results indicate that, in the high pressure extraction of the stevia plant materials, the optimal extraction effect can be achieved when the mass-volume ratio is between 1:20 and 1:30.

Embodiment 24a Influence of the Pressure on High
Pressure Extraction with Ethanol According to the mass-volume ratio of 1:20 (m/v), a 10 kg-sample of dried leaves and stems (containing 8% Rebaudioside A) of *Stevia rebaudiana* Bertoni plant and ethanol are put under high pressure extraction with the extract pressure from 2000~5000 MPa, and for an extract time of 30 minutes.

The volume of the extracts is measured and evaporated to dryness. It is further allowed to dry to a constant weight and weighed. The samples are then obtained and tested for purity by HPLC method. Table 24a shows the experimental results.

TABLE 24a

Influence of the extract pressure on high
pressure extraction with ethanol.

| extract pressure (MPa) | Total weight of extract (kg) | Content of Rebaudioside A | Extraction conversion rate |
| --- | --- | --- | --- |
| 2000 | 3.05 | 24.8% | 94.5% |
| 3000 | 3.06 | 24.9% | 95.2% |

TABLE 24a-continued

Influence of the extract pressure on high
pressure extraction with ethanol.

| extract pressure (MPa) | Total weight of extract (kg) | Content of Rebaudioside A | Extraction conversion rate |
| --- | --- | --- | --- |
| 4000 | 3.06 | 24.9% | 95.2% |
| 5000 | 3.06 | 24.9% | 95.2% |

The above experiment results indicate that, in the high pressure extraction of the stevia plant materials, the optimal extraction effect can be achieved when the pressure is between 2000 and 3000 MPa.

Embodiment 24b Influence of the Pressure on High Pressure Extraction with Water

According to the mass-volume ratio of 1:20 (m/v), a 10 kg-sample of the dried leaves and stems (containing 8% Rebaudioside A) of *Stevia rebaudiana* Bertoni plant and water are put under high pressure extraction with the extract pressure from 2000~5000 MPa, and for an extract time of 30 minutes.

The volume of the extracts is measured and evaporated to dryness. It is further allowed to dry to a constant weight and weighed. The samples are then obtained and tested for purity by HPLC method. Table 24b shows the experimental results.

TABLE 24b

Influence of the extract pressure on
high pressure extraction with water.

| extract pressure (MPa) | Total weight of extract (kg) | Content of Rebaudioside A | Extraction conversion rate |
| --- | --- | --- | --- |
| 2000 | 3.02 | 25.1% | 94.7% |
| 3000 | 3.03 | 25.0% | 94.8% |
| 4000 | 3.03 | 25.0% | 94.8% |
| 5000 | 3.03 | 25.0% | 94.8% |

The above experiment results indicate that, in the high pressure extraction of the stevia plant materials, the optimal extraction effect can be achieved when the pressure is between 2000 and 3000 MPa.

Embodiment 25 Influence of Adsorption Flow Rate on the Purification Effect of Selective Polar Resins About 3 L of the filtrate (concentration of Rebaudioside A is 26 g/L) is provided and adsorbed with 2 kg of selective polar resins at a flow rate of 1, 2, 3 and 4 BV/h, respectively, then eluted with 40% (v/v) ethanol-water mixed solvent at a flow rate of 1 BV/h. After concentration, the eluate is crystallized with stirring at −20° C. for 24 hours. The obtained crude crystalline material is then recrystallized with stirring at −20° C. for another 24 hours. The obtained crystalline material is then filtered to collect crystals. Rebaudioside A is obtained after the crystals are dried at 80° C.

The volume of the extracts is measured and evaporated to dryness. It is further allowed to dry to a constant weight and weighed. The samples are then obtained and tested for purity by HPLC method. Table 25 shows the experimental results.

TABLE 25

Influence of adsorption flow rate on the purification
effect of selective polar resins.

| Adsorption flow rate (BV/h) | Weight of crystals (g) | Purity of Rebaudioside A | Yield |
| --- | --- | --- | --- |
| 1 | 68.6 | 99.65% | 85.3% |
| 2 | 68.2 | 99.44% | 84.8% |
| 3 | 66.3 | 99.52% | 82.5% |
| 4 | 64.1 | 99.37% | 79.6% |

The above experiment results indicate that, through the present invention, Rebaudioside A with a purity of not less than 99% can be extracted from stevia plant materials, and in the purification process with selective polar resins, the optimal purification effect can be achieved when the adsorption flow rate is from 1 to 2 BV/hour.

Embodiment 26 Influence of the Elution Solvent Ratio on the Purification Effect of Selective Polar Resins A 3L-sample of the filtrate (concentration of Rebaudioside A is 26 g/L) is provided and adsorbed with 2 kg of selective polar resins at a flow rate of 1.5 BV/h. It is then eluted with 30%, 40%, 50% and 60% (v/v) ethanol-water mixed solvent respectively at a flow rate of 1 BV/h. After concentration, the eluate is crystallized with stirring at −20° C. for 24 hours. The obtained crude crystalline material is recrystallized with stirring at −20° C. for another 24 hours. The obtained crystalline material is then filtered to collect crystals. Rebaudioside A is obtained after the crystals are dried at 80° C.

The volume of the extracts is measured and evaporated to dryness. It is further allowed to dry to a constant weight and weighed. The samples are then obtained and tested for purity by HPLC method. Table 26 shows the experimental results.

TABLE 26

Influence of the elution solvent ratio on the
purification effect of selective polar resins.

| Ratio of elution solvents (ethanol-water, v/v) | Weight of crystals (g) | Purity of Rebaudioside A | Yield |
| --- | --- | --- | --- |
| 30% | 65.5 | 99.63% | 81.6% |
| 40% | 68.1 | 99.52% | 84.7% |
| 50% | 68.8 | 99.48% | 85.5% |
| 60% | 68.5 | 99.55% | 85.2% |

The above experiment results indicate that, through the present invention, Rebaudioside A with a purity of not less than 99% can be extracted from stevia plant materials, and in the purification process with selective polar resins, the optimal elution effect can be achieved when using 50% to 60% (v/v) ethanol-water mixture as the elution solvent.

Embodiment 27 Influence of the Elution Flow Rate on the Purification Effect of Selective Polar Resins A 3L-sample of the filtrate (concentration of Rebaudioside A is 26 g/L) is provided and adsorbed with 2 kg of selective polar resins at a flow rate of 1.5 BV/h. It is then eluted with 40% (v/v) ethanol-water mixed solvent at a flow rate of 0.5, 1, 1.5 and 2 BV/h, respectively. After concentration, the eluate is crystallized with stirring at −20° C. for 24 hours. The obtained crude crystalline material is then recrystallized with stirring at −20° C. for another 24 hours, and filtered to collect crystals. Rebaudioside A is obtained after the crystals are dried at 80° C.

The volume of the extracts is measured and evaporated to dryness. It is further allowed to dry to a constant weight and weighed. The samples are then obtained and tested for purity by HPLC method. Table 27 shows the experimental results.

TABLE 27

Influence of the elution flow rate on the purification effect of selective polar resins.

| Elution flow rate (BV/h) | Weight of crystals (g) | Purity of Rebaudioside A | Yield |
|---|---|---|---|
| 0.5 | 68.4 | 99.65% | 85.2% |
| 1 | 68.9 | 99.23% | 85.5% |
| 1.5 | 68.8 | 98.46% | 84.7% |
| 2 | 69.5 | 97.18% | 84.4% |

The above experiment results indicate that, through the present invention, Rebaudioside A with a purity of not less than 99% can be extracted from stevia plant materials, and in the purification process with selective polar resins, the optimal elution effect can be achieved when the elution flow rate ranges from 0.5 and 1 BV/hour.

Embodiment 28 Comparison Between Continuous Countercurrent Extraction and Reflux Extraction Based on a mass-to-volume ratio of 1:6 (m/v), 1,000 grams of the leaves and stems of Stevia rebaudiana Bertoni and 7% (v/v) water-ethanol solvent mixture are put under continuous countercurrent extraction at 70° C. The flow rate of water-ethanol solvent mixture for each 1,000 grams of stevia plant materials is 2 L/h, and the continuous countercurrent extraction lasted for 3 hours.

At a mass-volume ratio of 1:4 (m/v), 1,000 grams of the leaves and stems of Stevia rebaudiana Bertoni and 7% (v/v) water-ethanol solvent mixture are put under reflux distillation. The reflux distillation is carried out in a device at around a temperature that would bring about the boiling point of ethanol. Reflux is allowed to occur for about 2 hours, after which the extract is collected and the reflux is distilled again. The reflux extraction is done for 3 times.

The volume of the extracts is measured and evaporated to dryness. It is further allowed to dry to a constant weight and weighed. The samples are then obtained and tested for purity by HPLC method. Table 28 shows the experimental results.

TABLE 28

Comparison between continuous countercurrent extraction and reflux extraction.

| Extraction method | Total weight of extract (g) | Content of Rebaudioside A | Extraction conversion rate |
|---|---|---|---|
| Continuous countercurrent extraction | 344 | 22.6% | 97.2% |
| Reflux extraction, first time | 176 | 23.8% | 52.3% |
| Reflux extraction, second time | 73 | 28.9% | 26.4% |
| Reflux extraction, third time | 44 | 16.1% | 8.8% |
| Statistics of reflux extraction | 293 | 23.9% | 87.5% |

The above experiment results indicate that, when continuous countercurrent extraction and reflux extraction are compared in the extraction of stevia plant materials, the use of continuous countercurrent extraction can have a higher content of Rebaudioside A, higher extraction conversion rate, as well as a shorter extraction time.

Embodiment 29 Comparison Between Stirred Freezing Crystallization and Normal Temperature Crystallization A 50.00 g-sample of 85% Rebaudioside A is put into a 1,000 ml triangular flask, to which 200 ml of ethanol solvent containing 8% water (v/v) is added. The flask is heated with stirring at 60° C. for 2.5 hours, then subjected to a freezing condition at −20° C. with stirring to allow crystallization to occur. After 24 hours, the content is filtered to collect the crude crystals, recrystallization was then conducted to obtain crystalline crystals. The crystals are dried at 80° C. to a constant weight and weighed. Samples are then collected and tested for purity by HPLC method. This embodiment produced 41.14 g of Rebaudioside A with 99.37% purity, and the yield is 96.2%.

50.00 g of 85% Rebaudioside A was put into a 1,000 ml triangular flask. 200 ml of ethanol solvent containing 15% water (v/v) was then added to the flask. The flask is then heated to 60° C. and allowed to crystallize at 25° C. for 24 hours. The content was then filtered to collect the crude crystals, recrystallization was then conducted to obtain crystalline crystals. The crystals are dried at 80° C. to a constant weight and weighed. Samples ware then collected and tested for purity by HPLC method. This Embodiment harvested 41.65 g of Rebaudioside A with 91.52% purity, and the yield is 89.7%.

The above experiment results indicate that, through the process as set forth in the present invention, Rebaudioside A with a purity of not less than 99% can be extracted from the stevia plant materials, and when compared with normal temperature crystallization, the stirred freezing crystallization can have a higher content of Rebaudioside A and higher crystallization yield.

The invention has been described with reference to various embodiments and examples, but is not limited thereto. Variations may be made without departing from the invention, which is limited only by the appended claims and their equivalents. Throughout the text and the claims, use of the word "about" in relation to a range of values is intended to modify both the high and low values recited, and reflects the penumbra of variation associated with measurement, significant figures, and interchangeability, as would be understood by a person having ordinary skill in the art to which the invention pertains.

The invention claimed is:

1. A method for producing purified Rebaudioside A, comprising the steps of:
   providing a quantity of Stevia rebaudiana Bertoni;
   producing a crude extract by contacting the quantity of Stevia rebaudiana Bertoni with a first solvent;
   filtering the crude extract to obtain a filtrate feed containing Rebaudioside A;
   adsorbing the Rebaudioside A onto a polar resin by passing the filtrate feed over the polar resin;
   desorbing the Rebaudioside A from the polar resin by eluting with a second solvent to obtain an eluent containing Rebaudioside A;
   forming a first concentrated eluent by concentrating the eluent containing Rebaudioside A to a concentration of at least about 65% Rebaudioside A on a dry weight basis;
   subjecting the first concentrated eluent to a crystallization stage to obtain at least about 85% Rebaudioside A on a dry weight basis; and
   isolating the Rebaudioside A as crystals or as a solution.

2. The method of claim 1, wherein the crude extract is produced using countercurrent extraction.

3. The method of claim 1, wherein the crude extract is produced using continuous countercurrent extraction.

4. The method of claim 1, wherein the crude extract is produced using ultrasonic extraction.

5. The method of claim 1, wherein the crude extract is produced using high pressure extraction.

6. The method of claim 1, wherein the first solvent is water.

7. The method of claim 1, wherein the first solvent is an alcohol.

8. The method of claim 7, wherein the first solvent is an ethanol.

9. The method of claim 1, wherein the first solvent is a mixture of alcohol and water.

10. The method of claim 1, wherein the second solvent comprises an alcohol.

11. The method of claim 10, wherein the second solvent comprises an ethanol.

12. The method of claim 1, wherein the second solvent comprises a mixture of about 30% to 60% by volume ethanol-in-water.

13. The method of claim 1, wherein the filtrate feed is obtained by passing the crude extract through a filtering membrane.

14. The method of claim 13, wherein the filtering membrane is a 1K membrane, and wherein the crude extract is passed through the membrane at a trans-membrane pressure ranging from about 15 to 30 PSI.

15. The method of claim 1, wherein the crystallization stage comprises cooling the first concentrated eluent to at least a first freezing temperature to obtain a crude crystalline-containing material with at least about 85% by weight Rebaudioside A, on a dry-weight basis.

16. The method of claim 15, wherein the first concentrated eluent is stirred for about 24 hours while the first concentrated eluent is being collected at or below the first freezing temperature.

17. The method of claim 15, wherein the first freezing temperature is about −20° C.

18. The method of claim 15, further comprising cooling the crude crystalline-containing material to at least a second freezing temperature to obtain a purified crystalline-containing material containing at least about 99% by weight Rebaudioside A.

19. The method of claim 18, further comprising drying the purified crystalline-containing material containing at least about 99% by weight Rebaudioside A.

20. The method of claim 18, wherein the second freezing temperature is about −20° C.

21. The method of claim 1, wherein the step of producing a crude extract further comprises dispersing the crude extract with water.

22. The method of claim 1, wherein the filtrate feed is passed through the polar resin at a rate of about 1 to 4 BV/h.

23. The method of claim 1, wherein the step of eluting with the second solvent proceeds at a rate ranging from about 0.5 to 2 BV/h.

24. The method of claim 1, wherein the Rebaudioside A is isolated as crystals of greater than about 99% purity.

25. The method of claim 1, wherein the quantity of *Stevia rebaudiana* Bertoni and the quantity of the first solvent are provided at a mass-to-volume ratio ranging from about 1:3 to 1:9.

26. The method of claim 1, wherein the crude extract is produced at a temperature of from about 50° C. to 80° C.

27. The method of claim 1, wherein the step of contacting the quantity of *Stevia rebaudiana* Bertoni with the first solvent comprises contacting the quantity of *Stevia rebaudiana* Bertoni with water at a flow rate of about 1 to 4 L/h for each 1000 g of *Stevia rebaudiana* Bertoni.

28. The method of claim 21, wherein the step of dispersing the crude extract with water is carried out at a rate of from about 10 to 40 liters per square meter per hour.

29. The method of claim 1, further comprising drying the isolated Rebaudioside A crystals.

30. The method of claim 15, wherein the isolated Rebaudioside A is further purified through a recycling step, wherein the recycling step comprises: directing the crystalline liquor to a concentrating device; concentrating the crystalline liquor to obtain a concentrated recycled crystalline liquor; condensing the concentrated recycled crystalline liquor to obtain a recycle feed; and feeding the recycle feed to join the filtrate feed.

31. The method of claim 30, wherein the recycling step is carried out at least once.

32. A method for producing purified Rebaudioside A, comprising the steps of:
providing a quantity of stevia glycosides;
separating the stevia glycosides by column chromatography to obtain a crude extract, wherein the column chromato aphy proceeds by eluting with an eluting solvent comprising an about 20:1 to 20:4 volume ratio of ethyl acetate and water-ethanol mixed solvent;
contacting the crude extract with a solvent to form a mixture; and
purifying the mixture to obtain Rebaudioside A crystals.

33. The method of claim 32, wherein the solvent comprises an alcohol.

34. The method of claim 32, wherein the solvent comprises an ethanol-water mixture.

35. The method of claim 32, wherein the solvent comprises an ethanol-water mixture having an ethanol from about 4% to 10% by volume ethanol.

36. The method of claim 35, wherein the step of purifying the mixture comprises heating the mixture to about 60° C. for about 1 to 4 hours, with heat stirring to obtain a heated mixture, followed by cooling the heated mixture to about −20° C. or less for about 12 hours to 24 hours with stirring to form crystals of Rebaudioside A.

37. The method of claim 36, further comprising drying the mixture.

38. The method of claim 32, wherein the column chromatography is carried out using a column loaded with a silica gel.

39. The method of claim 38, wherein the silica gel is provided at a stevia glycosides-to-silica gel mass ratio of about 1:2 to 1:5.

40. The method of claim 32, wherein the water-ethanol mixed solvent has a water-to-ethanol weight ratio of about 1:10.

41. The method of claim 32, wherein the step of separating the stevia glycosides further comprises concentrating the crude extract.

42. The method of claim 32, wherein the step of separating the stevia glycosides further comprises determining a content of Rebaudioside A from a plurality of fractions of the crude extract; combining the fractions; and concentrating the fractions to obtain Rebaudioside A crystals.

43. The method of claim 32, wherein the Rebaudioside A crystals comprises Rebaudioside A in a purity greater than about 99% Rebaudioside A by weight, on a dry weight basis.

* * * * *